United States Patent
Fan et al.

(10) Patent No.: US 6,309,700 B1
(45) Date of Patent: Oct. 30, 2001

(54) METHOD OF MAKING LONG LIFE ELECTROLUMINESCENT PHOSPHOR

(75) Inventors: Chen-Wen Fan, Sayre; Richard G. W. Gingerich, Towanda; Tuan Anh Dang, Sayre; Dale E. Benjamin, Athens, all of PA (US)

(73) Assignee: Osram Sylvania Inc., Danvers, MA (US)

( * ) Notice: Subject to any disclaimer, the term of this patent is extended or adjusted under 35 U.S.C. 154(b) by 2 days.

(21) Appl. No.: 09/585,221

(22) Filed: Jun. 1, 2000

Related U.S. Application Data

(62) Division of application No. 09/153,978, filed on Sep. 16, 1998, now abandoned.
(60) Provisional application No. 60/065,950, filed on Oct. 27, 1997.

(51) Int. Cl.$^7$ ............................... B05D 7/00; B32B 5/16
(52) U.S. Cl. .............................. 427/213; 427/64; 427/68; 427/70; 427/215; 427/255.2; 428/403; 428/404
(58) Field of Search .......................... 427/213, 64, 68, 427/70, 215, 255.2; 428/403, 404

(56) References Cited

U.S. PATENT DOCUMENTS

| | | | | |
|---|---|---|---|---|
| 4,585,673 | * | 4/1986 | Sigai | 427/213 |
| 4,825,124 | * | 4/1989 | Sigai | 313/480 |

* cited by examiner

*Primary Examiner*—Leszek Kiliman
(74) *Attorney, Agent, or Firm*—William H. McNeill

(57) ABSTRACT

A method of coating phosphor particles that comprises the steps of introducing an inert gas into a reaction vessel; charging phosphor particles into the reaction vessel; heating the reaction vessel to a reaction temperature; introducing a coating precursor into the reaction vessel; introducing an oxygen/ozone mixture into the reaction vessel; and maintaining the agitation, inert gas flow, oxygen/ozone mixture flow and precursor supply for a time sufficient to coat the phosphor particles. This process yields phosphors having a half-life of upwards of 3,100 hours with efficacys of greater than 6 lumens per watt (lm/w).

10 Claims, No Drawings

METHOD OF MAKING LONG LIFE ELECTROLUMINESCENT PHOSPHOR

This application is division of Ser. No. 09/153,978, filed Sept. 16, 1998, now abandoned and claims the benefit of provisional patent application Ser. No. 60/065,950, filed Oct. 27, 1997.

TECHNICAL FIELD

This invention relates to coated particles and more particularly to particles having a conformal coating thereon. More particularly, this invention relates to phosphors and still more particularly to electroluminescent phosphors having thereon a coating that protects the phosphor from moisture absorption and greatly increases the life and efficacy.

BACKGROUND ART

Coated phosphors are known from U.S. Pat. Nos. 4,585,673; 4,825,124; 5,080,928; 5,118,529; 5,156,885; 5,220,243; 5,244,750; and 5,418,062. It is known from some of the just-mentioned patents that a coating precursor and oxygen can be used to apply a protective coating. See, for example, U.S. Pat. Nos. 5,244,750 and 4,585,673. The coating processes in several of the others of these patents employ chemical vapor deposition to apply a protective coating by hydrolysis. It would be an advance in the art if a coating process could be developed that operated in the absence of water or water vapor. It would be a further advance to increase the efficacy and the life of such coated phosphors.

DISCLOSURE OF INVENTION

It is, therefore, an object of the invention to obviate the disadvantages of the prior art.

It is another object of the invention to enhance the operation of coated phosphors.

Yet another object of the invention is the provision of a phosphor coating method that does not employ water or water vapor, These objects are accomplished, in one aspect of the invention, by a method of coating phosphor particles that comprises the steps of introducing an inert gas into a reaction vessel; charging phosphor particles into said reaction vessel while preferably agitating same; heating said reaction vessel to a reaction temperature; introducing a coating precursor into said reaction vessel; introducing an oxygen/ozone mixture into said reaction vessel; and maintaining said inert gas flow, oxygen/ozone mixture flow and precursor supply for a time sufficient to coat said phosphor particles. This process yields phosphors with a conformal coating thereon that substantially eliminates moisture absorption and provides a phosphor having a half-life of upwards of 3100 hours with efficacy's of greater than 6 lumens per watt (lm/w). Additionally, the process is accomplished in the absence of water or water vapor.

BEST MODE FOR CARRYING OUT THE INVENTION

For a better understanding of the present invention, together with other and further objects, advantages and capabilities thereof, reference is made to the following disclosure and appended claims.

EXAMPLE I

An inert gas, preferably nitrogen, with a flow rate of 4.5 liters per minute (l/min) was introduced into the bottom of an empty, 2 inch diameter quartz reaction vessel that was used as a fluidized bed reactor. 2.5 kg of copper-doped zinc sulfide electroluminescent phosphor was charged into the reaction vessel, which had a height of 36 inches. The shaft of the vibrating mixer was then turned on at a speed of 60 cycles per minute and the reaction vessel was heated by its surrounding electric furnace. When the reactor temperature reached 160° C. oxygen gas with a flow rate of 4.6 l/min was passed through an ozone generator at a rate sufficient to pick up 5 to 6 wt.% ozone. The ozone/oxygen mix was fed through an opening of the hollow vibrating shaft into the reaction vessel. In addition, nitrogen gas at a flow rate of 0.5 l/min was passed through a container of coating precursor that was maintained at room temperature. The preferred coating precursor is trimethylaluminum (TMA). The dilute TMA precursor vapor was introduced from the bottom of the reactor vessel to react with the TMA precursor vapor was introduced from the bottom of the reactor vessel to react with the ozone/oxygen mix to form the protective, conformal coating on the surface of the individual phosphor particles. The coating time was 48 hours. The reaction vessel was maintained at 160 ±3° C. and the nitrogen, precursor, and oxygen/ozone gas flow rates were all kept constant. The resulting coated phosphor had the characteristics shown by lot number 188D in Table I. The half life tests (designated by Life Hrs. in Table I) are conducted at 72° F. in a relative humidity of 50%.

TABLE I

| | | | | | | | | Lamp Performance | | | |
|---|---|---|---|---|---|---|---|---|---|---|---|
| Lot Number | Temp. °C. | Time Hrs. | TMA/N2 l/min | O2O3 l/min | N2 l/min | BET m2/gm | Aluminum % | Light Output 24 Hrs. | 100 Hrs. | Life Hrs. | Efficacy lm/watt |
| 188D | 160 | 48 | 0.5 | 4.6 | 4.5 | 0.05 | 4.1 | 19.3 | 19.6 | 3,156 | 6.7 |
| 189C | 235 | 40 | 0.5 | 4.6 | 4.5 | 0.08 | 4.2 | 19.5 | 18.6 | 2,302 | 7.6 |

EXAMPLE II

The procedure of Example I was followed except that the temperature was raised to 235° C. and the time was limited to 40 hours. The resulting coated phosphor had the characteristics shown by Lot No. 189C in Table I. While the efficacy increased from 6.7 lm/watt to 7.6 lm/watt, the half-life showed some degradation, although a half life of 2300 hours still represents a viable commercial product.

Other changes that were occurring in the phosphors fired at the different temperatures are reflected in the color output. The phosphors coated at 160° C. emit in the blue-green region and those phosphors coated at 235° C. shift toward the yellow.

Further testing has shown that results are still further improved by increasing the time of the reaction up to about 70 hours, and increasing the temperature for the blue-green emitting material to about 180° C. As will be clearly seen from Table I, two optimum firing temperatures exist with this process to provide long life, efficient phosphors with one of two color points.

Longer reaction times are predicted to be still more efficacious but, of course, must be dependent upon the size and/or number of the reaction vessels and the throughput desired or necessitated to make a viable, affordable, commercial product.

While there have been shown and described what are at present considered the preferred embodiments of the invention, it will be apparent to those skilled in the art that various changes and modifications can be made herein without departing from the scope of the invention as defined by the appended claims.

What is claimed is:

1. In a method of coating phosphor particles, the steps comprising: introducing an inert gas into a reaction vessel; charging phosphor particles into said reaction; heating said reaction vessel to a reaction temperature; introducing a coating precursor into said reaction vessel; introducing an oxygen/ozone mixture into said reaction vessel; and maintaining said inert gas flow, oxygen/ozone mixture flow and precursor supply for a time sufficient to coat said phosphor particles.

2. The method of claim 1 wherein said precursor in trimethylaluminum.

3. The method of claim 1 wherein said oxygen/ozone mixture comprises about 5 to 6 wt. % ozone.

4. The method of claim 1 wherein said inert gas is nitrogen.

5. The method of claim 1 wherein said reaction temperature is about 160° C.

6. The method of claim 1 wherein said reaction temperature is between 160 and 180° C.

7. The method of claim 1 wherein said reaction temperature is about 235° C.

8. The method of claim 1 wherein said time sufficient to coat said phosphor is between about 40 to about 70 hours.

9. The method of claim 1 wherein said phosphor particles are charged into said reaction vessel with agitation.

10. The method of claim 9 wherein said agitation is maintained during said introduction of said oxygen/ozone mixture.

* * * * *